(12) United States Patent
Noguchi et al.

(10) Patent No.: US 12,071,053 B2
(45) Date of Patent: Aug. 27, 2024

(54) SEAT

(71) Applicant: DELTA KOGYO CO., LTD., Hiroshima (JP)

(72) Inventors: Chiha Noguchi, Hiroshima (JP); Yoshinobu Ohtani, Hiroshima (JP)

(73) Assignee: DELTA KOGYO CO., LTD., Hiroshima (JP)

( * ) Notice: Subject to any disclaimer, the term of this patent is extended or adjusted under 35 U.S.C. 154(b) by 0 days.

(21) Appl. No.: 17/759,081

(22) PCT Filed: Mar. 29, 2021

(86) PCT No.: PCT/IB2021/052563
§ 371 (c)(1),
(2) Date: Jul. 19, 2022

(87) PCT Pub. No.: WO2021/171275
PCT Pub. Date: Sep. 2, 2021

(65) Prior Publication Data
US 2023/0347801 A1 Nov. 2, 2023

(30) Foreign Application Priority Data

Feb. 25, 2020 (JP) .................. 2020-029787

(51) Int. Cl.
*B60N 2/58* (2006.01)
(52) U.S. Cl.
CPC .................. *B60N 2/5891* (2013.01)
(58) Field of Classification Search
CPC .......... B60N 2/5891; A47C 17/02; B68G 7/05
USPC .................................................. 297/452.61
See application file for complete search history.

(56) References Cited

U.S. PATENT DOCUMENTS

| 7,229,129 B2 * | 6/2007 | White ................. B60N 2/5657 |
| | | 297/180.12 |
| 8,783,768 B2 | 7/2014 | Severinski et al. |
| 10,118,525 B2 * | 11/2018 | Kromm ............... B60N 2/5816 |
| 11,247,593 B2 * | 2/2022 | Townley .............. B60N 2/5891 |

FOREIGN PATENT DOCUMENTS

| EP | 3 530 519 A1 | 8/2019 |
| JP | H07-252780 A | 10/1995 |
| JP | 2002-274238 A | 9/2002 |
| JP | 2019-131057 A | 8/2019 |
| WO | WO-2011143680 A1 * | 11/2011 ........... B60N 2/4242 |

OTHER PUBLICATIONS

International Search Report issued in PCT/IB2021/052563; mailed Jun. 29, 2021.

* cited by examiner

*Primary Examiner* — Mark R Wendell
(74) *Attorney, Agent, or Firm* — Studebaker & Brackett PC

(57) ABSTRACT

Provided is a seat which achieves reduction in wrinkling and looseness while maintaining flexibility of a cover made of leather. The seat includes: a cover made of leather and covering a pad; and a base fabric adhered to the cover. The base fabric is an woven fabric including a plurality of first threads running in a predetermined direction and a plurality of second threads running in a direction intersecting the predetermined direction. The first threads and the second threads are woven in a zigzag manner to planarly fill a surface of the base fabric with polygonal space parts defined by the first threads and the second threads.

9 Claims, 14 Drawing Sheets

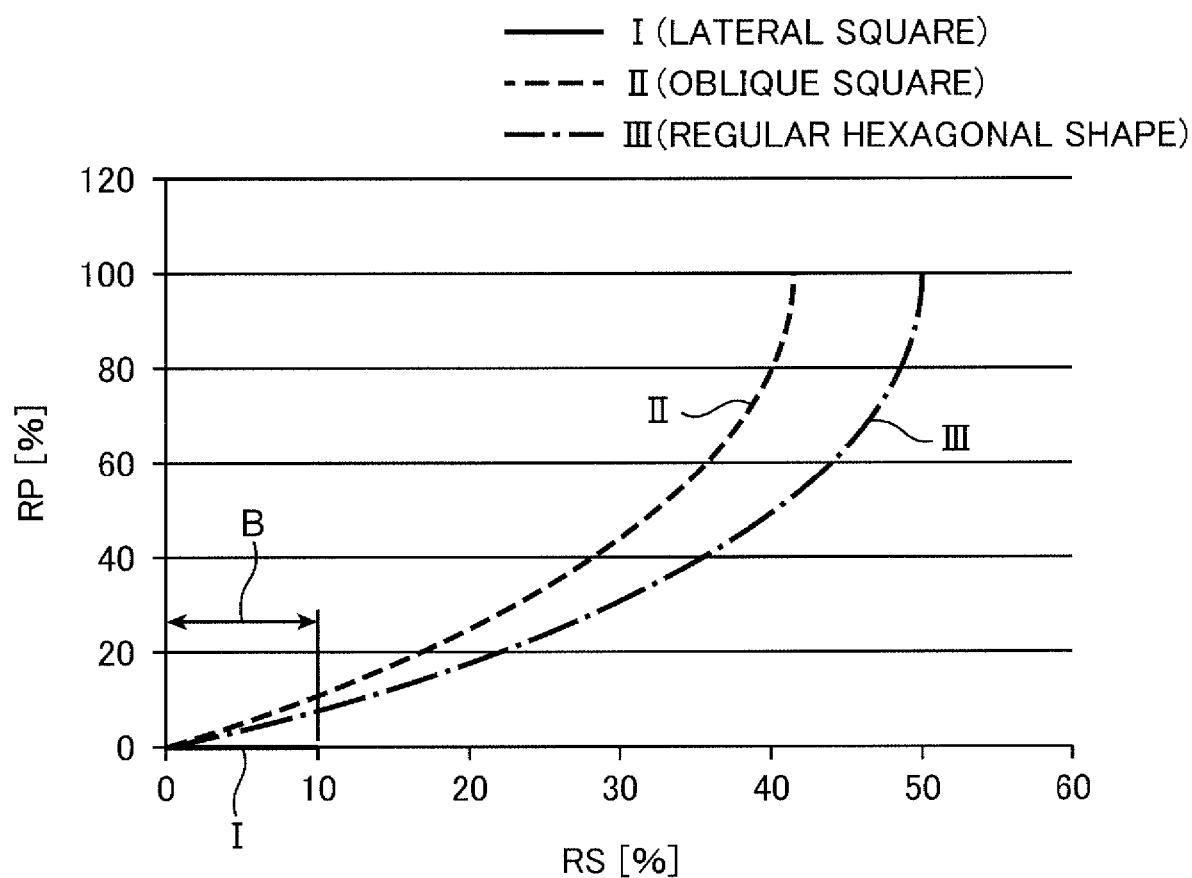

SEAT

TECHNICAL FIELD

The present invention relates to a seat including a cover made of leather.

BACKGROUND ART

There has been recently an increasing number of seats each adopting a cover made of leather, such as natural leather, for covering a surface of a pad of a vehicle seat.

The cover made of leather is less stretchable and contractible than a cover made of synthetic resin, and thus is likely to wrinkle and be loosen when being extended over a surface of a three-dimensional pad.

In this regard, Patent Literature 1 aims at reducing wrinkling and looseness of a cover made of leather by attaching a base fabric to a rear surface of the cover. The base fabric disclosed in Patent Literature 1 is a woven fabric in a grid pattern of warps and wefts made of synthetic resin, straightly running, and perpendicularly intersecting each other to define a plurality of rectangular space parts.

The cover made of leather and having the rear surface to which the base fabric is attached can keep a predetermined curving shape owing to a tensile force of the warps and wefts of the base fabric. Therefore, the cover is less likely to wrinkle and be loosened than a cover having a rear surface to which no base fabric is attached.

CITATION LIST

Patent Literature

Patent Literature 1: U.S. Pat. No. 8,783,768

SUMMARY OF INVENTION

Problem to be Solved by the Invention

The aforementioned base fabric in the grid pattern of the warps and wefts straightly running and perpendicularly intersecting each other is difficult to stretch in a direction along the warps or the wefts. Hence, the cover made of leather to which the base fabric is attached is easily deprived of flexibility (in particular, flexibility in an out-of-plane direction of the cover), and thus faces a problem of difficulty in achieving compatibility of reduction in the wrinkling and looseness of the cover, and reliable flexibility thereof.

The present invention has been accomplished in view of the circumstances described above, and an object thereof is to provide a seat which achieves reduction in wrinkling and looseness of a cover made of leather while maintaining the flexibility thereof.

Means for Solving the Problem

To solve the problem described above, a seat according to the present invention includes: a pad; a cover made of leather and covering a surface of the pad; and a base fabric adhered to a surface of the cover that faces the pad. The base fabric includes a plurality of first linear members running in a predetermined direction and a plurality of second linear members running in a direction intersecting the predetermined direction. The first linear members and the second linear members are connected to each other in a zigzag manner to planarly fill (perform plane-filling onto) a surface of the base fabric with polygonal space parts defined by the first linear members and the second linear members.

The term "planarly fill", "plane-filling" or the like used in the present invention means planarly filling of a surface of the base fabric with a plurality of polygonal space parts without a gap between the space parts. In other words, referring to two adjacent polygonal space parts, the "plane-filling" allows a specific side section of one polygonal space part to be in close contact with a corresponding side section of the other polygonal space part without a gap therebetween.

Effects of the Invention

The seat according to the present invention achieves reduction in wrinkling and looseness of a cover made of leather while maintaining the flexibility thereof.

BRIEF DESCRIPTION OF DRAWINGS

FIG. 7 is a graph showing a relation between a tensile rate RS and a compression rate RP in horizontal pulling of the polygonal space parts. In the graph, line I is directed to lateral square space parts serving as Comparative Example, line II is directed to oblique square space parts falling within the present invention, and line III is directed to regular hexagonal space parts in the embodiment.

DESCRIPTION OF EMBODIMENTS

Hereinafter, an embodiment of a seat according to the present invention will be described in detail with reference to the accompanying drawings.

Figure 1:
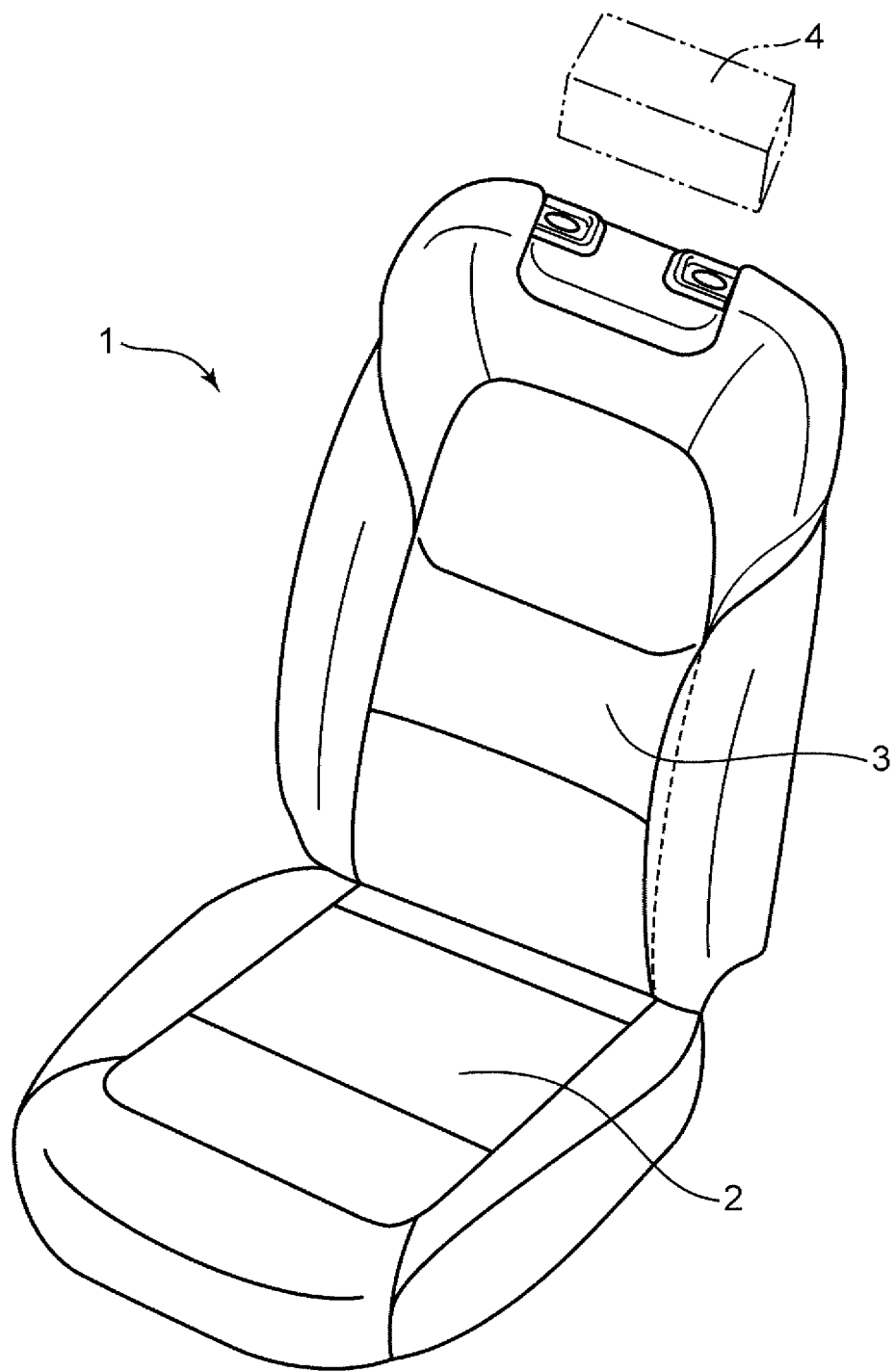
FIG. 1 is a perspective view showing an overall configuration of a seat according to an embodiment of the present invention.

A seat 1 for an automobile representing an embodiment of a seat according to the present invention includes, as illustrated in FIG. 1, a seat cushion 2 for supporting the buttocks of a seated person, a seatback 3 standing at a rear end of the seat cushion 2 for supporting the back of the seated person, and a headrest 4 located at a top of the seatback 3 for supporting the head of the seated person.

Figure 2:
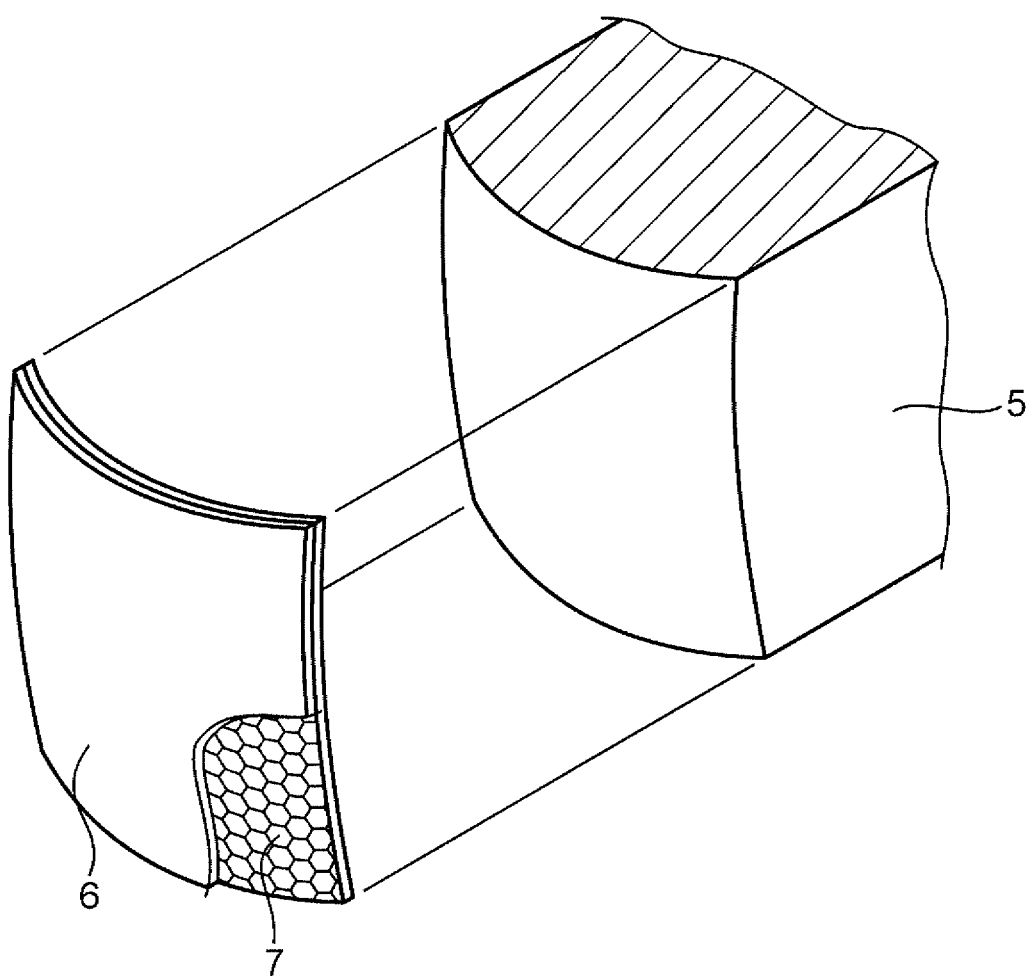
FIG. 2 is an exploded and partly cut-off perspective view showing a cover made of leather and a base fabric each covering a surface of a three-dimensional pad in the seat shown in FIG. 1.

Each of the seat cushion 2 and the seatback 3 includes, as shown in FIG. 2, a pad 5 being a base member, a cover 6 made of leather and covering a surface of the pad 5, and a base fabric 7 adhered to a surface of the cover 6 that faces the pad 5. The pad 5 has a three-dimensional shape corresponding to the respective parts of the seat cushion 2 and the seatback 3. The surface of the pad 5 results in forming a complicated three-dimensionally curving shape.

The leather cover 6 is mainly made of natural leather obtained by flattening and processing a skin 6 of an animal like a cow. Alternatively, the cover 6 may be made of artificial leather.

As shown in FIG. 2, the base fabric 7 is adhered to the surface of the cover 6 that faces the pad 5 by adhesive.

Figure 3:
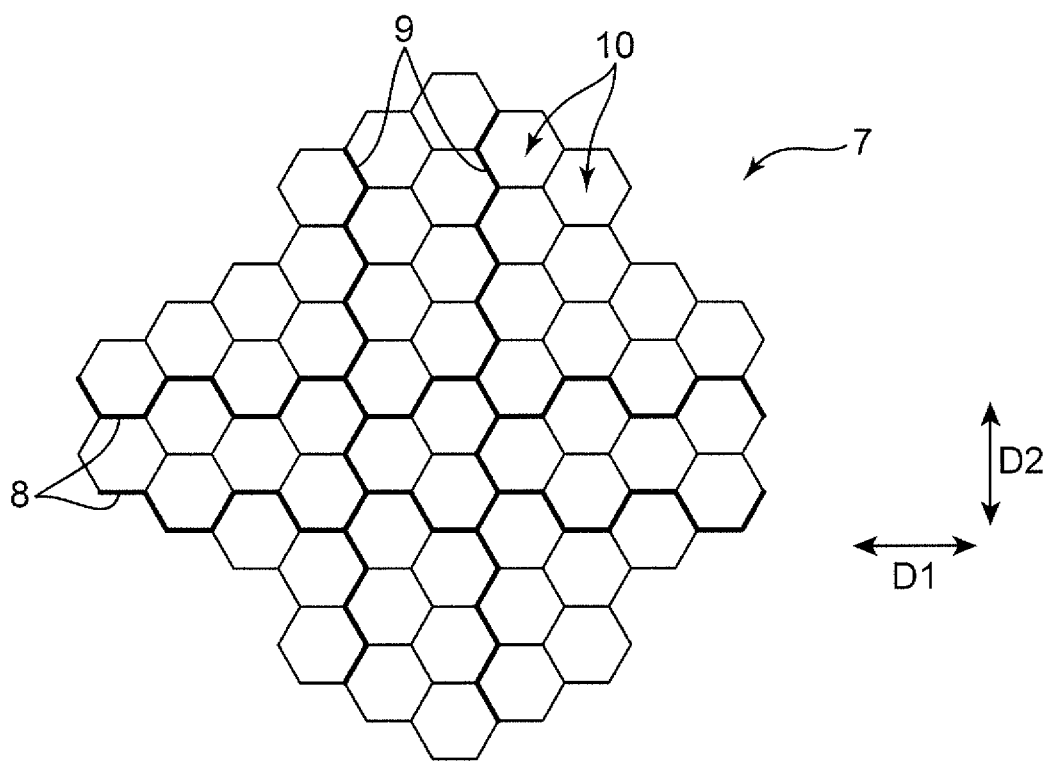
FIG. 3 is an explanatory plan view showing a structure of the base fabric shown in FIG. 2.

As shown in FIG. 3, the base fabric 7 is a woven fabric including a plurality of first threads 8, as first linear members, running in a predetermined direction D1 and a plurality of second threads 9, as second linear members, running in a direction D2 intersecting the predetermined direction D1. The first threads 8 and the second threads 9 are made of material having certain tensile strength, e.g., synthetic fibers, natural fibers, or other fibers, specifically, are producible with fibers made of synthetic resin, such as polyester and polyamide.

Hexagonal space parts 10, as an example of the polygonal space part, are woven in the base fabric 7. Specifically, the first threads 8 and the second threads 9 are woven in a zigzag manner to planarly fill a surface of the base fabric 7 with hexagonal space parts 10 defined by the first threads 8 and the second threads 9, thereby being connected to each other. In this way, the hexagonal space parts 10 are woven in the base fabric 7. In other words, each hexagonal (polygonal) space part 10 is a planar space defined by six side sections (multiple side sections) formed of the corresponding first threads 8 and second threads 9.

Each polygonal space part 10 is defined by the first threads 8 and the second threads 9 running in the zigzag manner, specifically, defined by a portion of the first thread 8 having two or more corners and a portion of the second thread 9 having two or more corners. The polygonal space part 10 may have a polygonal shape equal to or larger than a hexagonal shape sufficient to planarly fill the surface of the base fabric 7, and thus is not limited to the hexagonal space part 10 shown in FIG. 3. Various modifications of the polygonal space part will be collectively described in detail later.

In the base fabric 7 shown in FIG. 3, the first threads 8 run in the predetermined direction D1 (e.g., a horizontal direction) while zigzagging in the direction D2 (e.g., a vertical direction) perpendicularly intersecting the predetermined direction D1. By contrast, the second threads 9 run in the direction D2 while zigzagging in the direction D1.

Figure 4C:
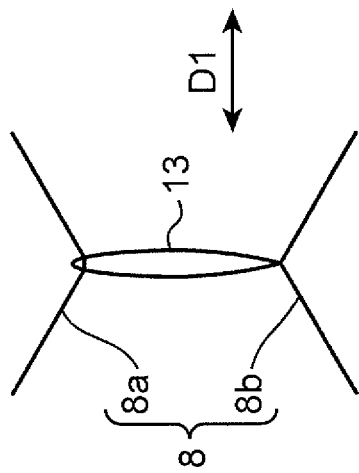
FIG. 4C shows another view of a region, corresponding to the region A shown in FIG. 4A, where two first threads are connected to each other via a connecting member having a loop shape.
Figure 4B:
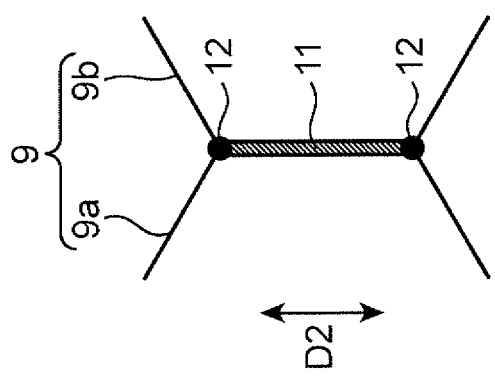
FIG. 4B is an enlarged view of a region A shown in FIG. 4A where two second threads twistedly join each other.
Figure 4A:
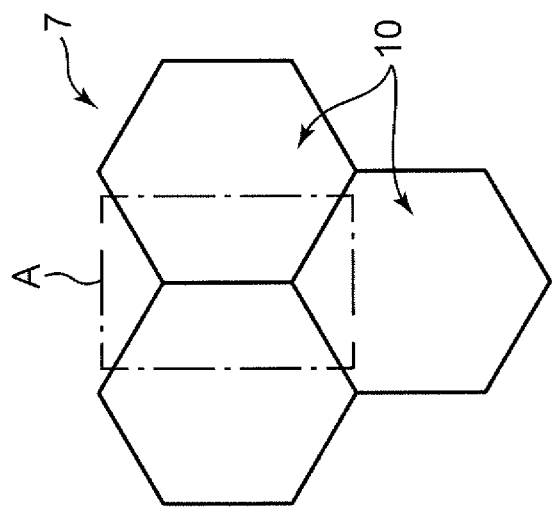
FIG. 4A is an enlarged view of a structure of hexagonal space parts of the base fabric shown in FIG. 3.

In the base fabric 7 planarly filled with the polygonal (hexagonal) space parts 10 as described above, for example, the second threads 9 (or first threads 8) twistedly join each other as shown in FIG. 4B. In FIG. 4B, adjacent second thread sections 9a, 9b twistedly join each other to form a twisted part 11, and the twisted part 11 has opposite ends each restricted by a knot 12 of the second thread sections 9a, 9b tied to each other.

Alternatively, the base fabric 7 may include a connecting member 13 that connects the first threads 8 (or second threads 9) to each other at a distance therebetween. The connecting member 13 may be formed of, for example, a thread loop, and allows first thread sections 8a, 8b to pass through the loop so that the first thread sections 8a, 8b are connected to each other at a distance therebetween.

Characteristics of Embodiment (1) As described above, the seat 1 according to the embodiment includes, as shown in FIGS. 2 to 3, the pad 5, the cover 6 made of leather and covering the surface of the pad 5, and the base fabric 7 adhered to the surface of the cover 6 that faces the pad 5. The base fabric 7 is an woven fabric including the first threads 8, as the first linear members, running in the predetermined direction D1 and the second threads 9, as the second linear members, running in the direction D2 intersecting the predetermined direction D1. The first threads 8 and the second threads 9 are connected to each other in the zigzag manner to planarly fill the surface of the base fabric 7 with the polygonal (hexagonal, in the embodiment) space parts 10 defined by the first threads 8 and the second threads 9.

In this configuration, the base fabric 7 adhered to the cover 6 made of leather includes the polygonal space parts 10. Therefore, even when the base fabric 7 is pulled in any direction (e.g., in the direction D1 as shown in FIG. 5A or in the direction D2 as shown in FIG. 5B), a portion of one of or both the first threads 8 and second threads 9 running in the zigzag manner to define the polygonal space parts 10 is stretched and another portion of the other of or both the first threads 8 and second threads 9 is contracted.

Figure 5A:
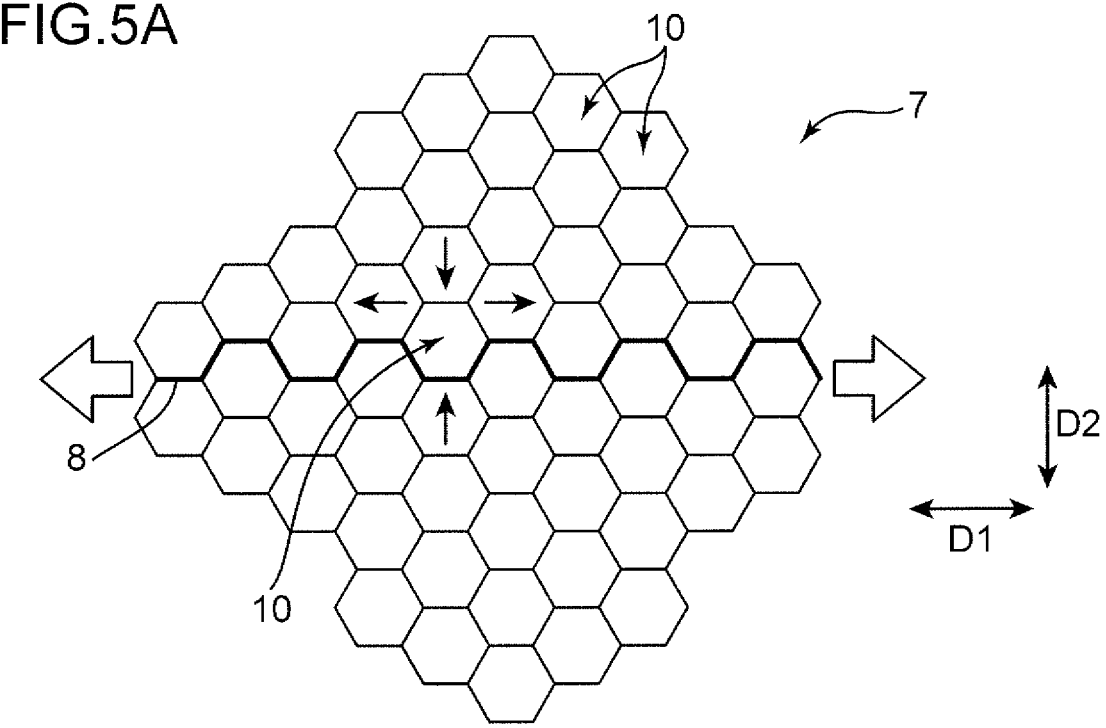
FIG. 5A and FIG. 5B are explanatory views showing deformation of the hexagonal space parts when the first threads and the second threads in FIG. 3 are pulled respectively.
Figure 5B:
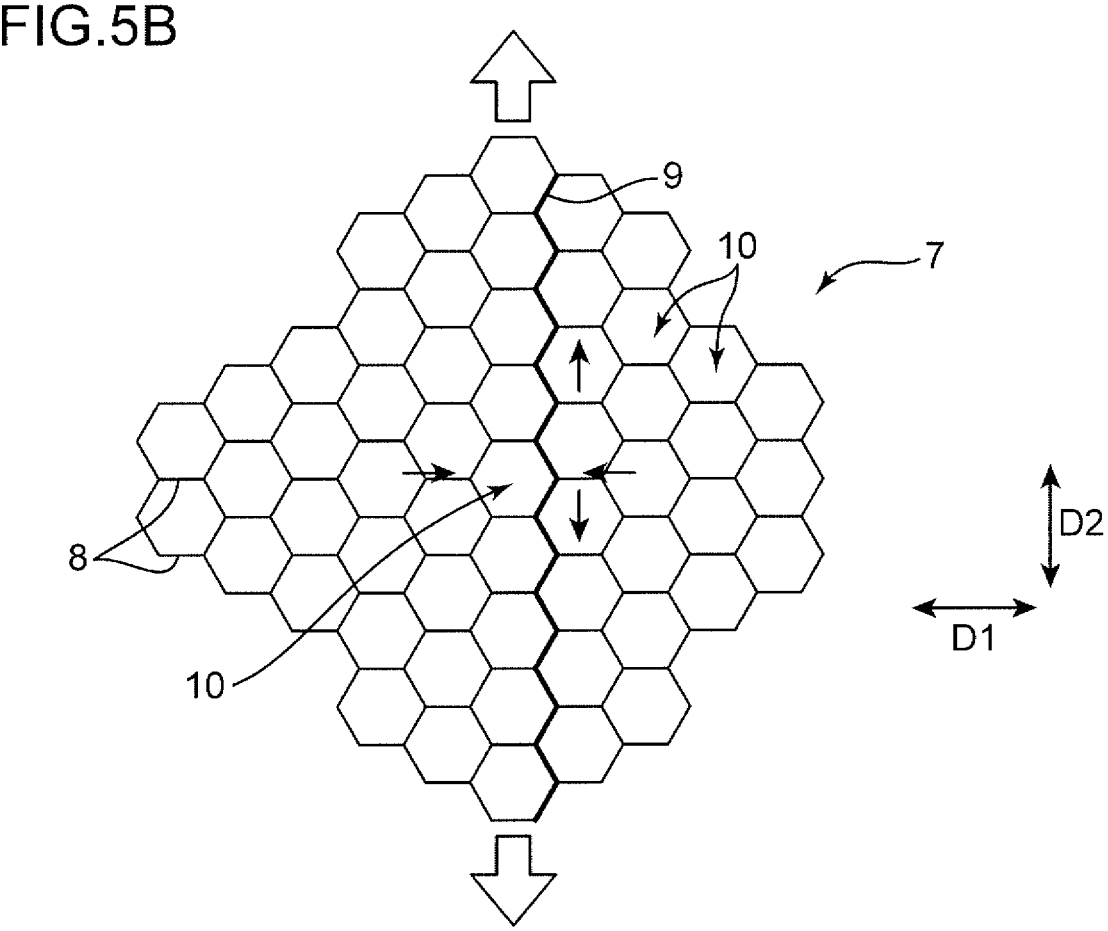

Specifically, as shown in FIG. 5A, when the base fabric 7 is pulled from the opposite sides thereof in the direction D1 in which the first threads 8 runs, the first threads 8 running in the zigzag manner are stretched in the direction D1 and deformed to be straighter, so that the space parts 10 are contracted in the direction D2 perpendicularly intersecting the first direction D1. Consequently, the second threads 9 perpendicularly intersecting the first threads 8 as shown in FIG. 3 are contracted in the direction D2. By contrast, as shown in FIG. 5B, when the base fabric 7 is pulled from the opposite sides thereof in the direction D2 in which the second threads 9 run, the second threads 9 running in the zigzag manner are stretched in the direction D2 and deformed to be straighter, so that the space parts 10 are contracted in the direction D1 perpendicularly intersecting the direction D2. Consequently, the first threads 8 perpendicularly intersecting the second threads 9 as shown in FIG. 3 are contracted in the direction D1.

Moreover, when the base fabric 7 shown in FIG. 3 is pulled in a direction (e.g., obliquely rightward) intersecting each of the direction D1 and the direction D2, a portion (e.g., a portion in a region expanding obliquely rightward) of both the first threads 8 and second threads 9 running in the zigzag manner is stretched and another portion (e.g., another portion in a region expanding obliquely leftward) of both the first threads 8 and second threads 9 is contracted.

The above-described structure of the base fabric 7 attains reduction in the wrinkling and looseness of the cover 6 while maintaining the characteristics of flexibility (in particular, the flexibility of the cover 6 in the out-of-plane direction, i.e., in a direction to or away from the pad 5) or pliability of the cover 6 made of leather to which the base fabric 7 is adhered.

(2) In other words, in the seat 1 according to the embodiment including the base fabric 7, as shown in FIG. 3, planarly filled with the polygonal (hexagonal) space parts 10 defined by the first threads 8 and second threads 9 running in the zigzag manner, the first threads 8 and the second threads 9 are pullable and compressible at the same time in such a way as to allow a tensile force and a compressive force to coexist in the base fabric 7. As a result, the seat 1 according to the embodiment achieves reduction in the wrinkling and looseness of the cover 6 while maintaining the flexibility of the cover 6 made of leather.

Figure 13:
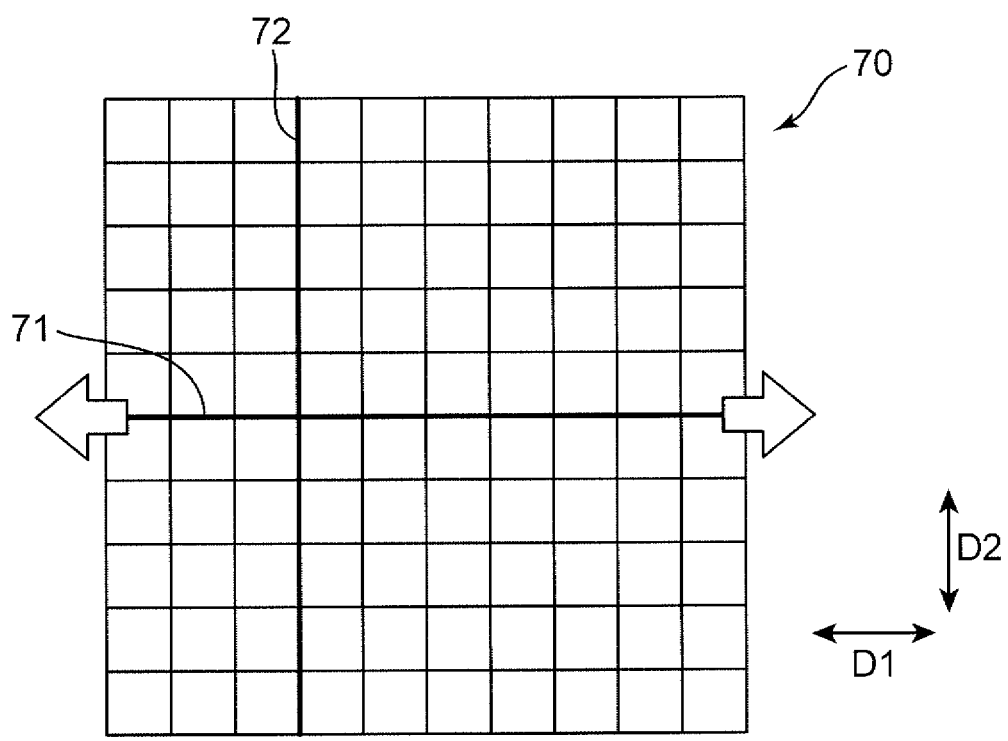
FIG. 13 is a plan view representing Comparative Example corresponding to FIG. 5, and showing a structure of a base fabric in a grid pattern of first linear threads and second linear threads perpendicularly intersecting each other.

Contrarily, in Comparative Example shown in FIG. 13, a base fabric 70 having a conventional structure where a grid pattern of first threads 71 and second threads 72 that are linear and perpendicularly intersect each other fails to allow a tensile force and a compressive force to coexist. This is because the first threads 71 are solely tensioned when the base fabric 70 is pulled in the direction D1 or the second threads 72 are solely tensioned when the base fabric 70 is pulled in the direction D2. Accordingly, Comparative Example shown in FIG. 13 fails to reduce the wrinkling and looseness of the cover while maintaining the flexibility of the cover made of leather.

Figure 6:
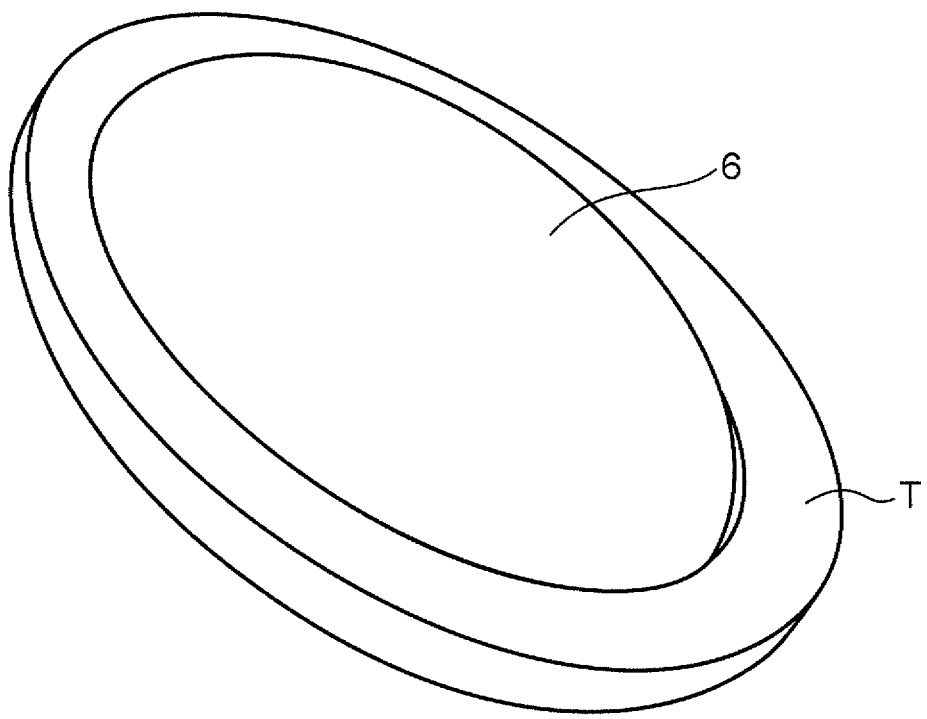
FIG. 6 shows a test sample representing a three-dimensional pad and covered with a cover made of leather to which the base fabric shown in FIG. 2 is attached without wrinkling and looseness of the cover.
Figure 14:
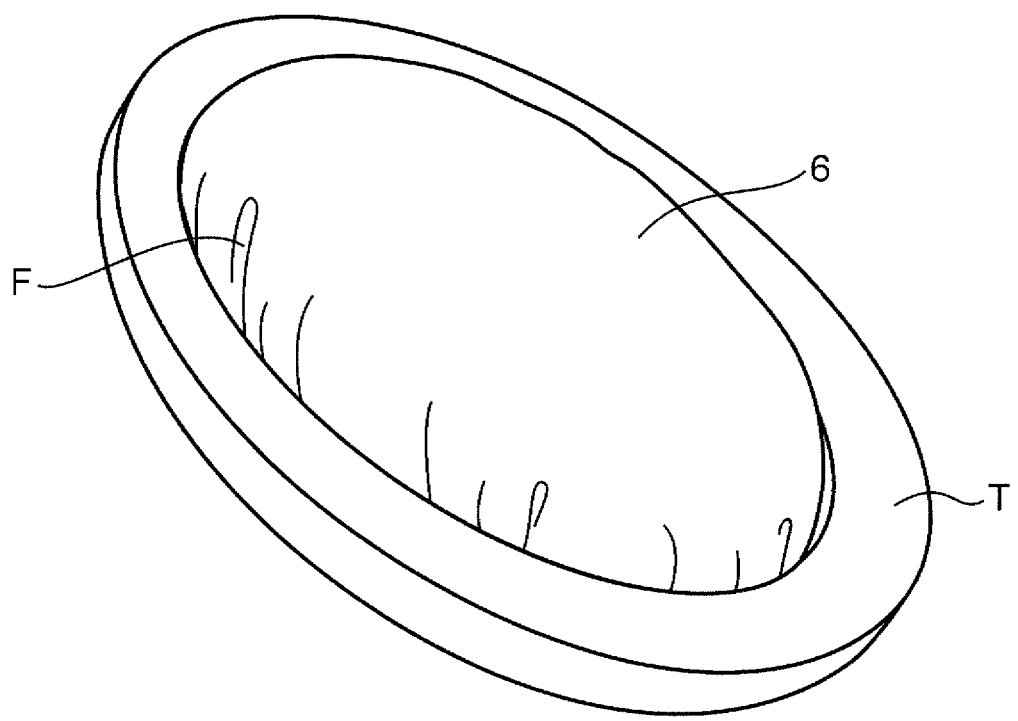
FIG. 14 shows, as another Comparative Example corresponding to FIG. 6, a test sample representing a three-dimensional pad and covered with a cover made of leather to which no base fabric is attached with wrinkling and looseness of the cover.

(3) Furthermore, it is seen from a model of the seat 1 according to the embodiment as shown in FIG. 6, specifically, a model of a test sample T representing the three-dimensional pad 5 and covered with the cover 6 made of leather to which the base fabric 7 shown in FIG. 2 is attached that the cover 6 smoothly extends along a curving surface of a semi-spheroid of the test sample T without wrinkling and looseness. By contrast, in a model of a test sample T, as a model of a seat according to another Comparative Example shown in FIG. 14, representing a three-dimensional pad 5 and covered with a cover 6 made of leather to which no base fabric 7 is attached, defects F resulting from wrinkling and looseness are visually seen on the peripheral edge of the cover 6.

(4) In the seat 1 according to the embodiment, each of the polygonal space parts 10 is defined by a portion of the first thread 8 having two or more corners and a portion of the second thread 9 having two or more corners. According to this configuration, the polygonal space part 10 can have various shapes, such as a hexagonal shape and an octagonal shape, by a combination of a portion of the first thread 8 running in the zigzag manner and having two or more corners and a portion of the second thread 9 running in the zigzag manner and having two or more corners. Therefore, it is possible to produce a base fabric 7 which is more effective to achieve the flexibility of the cover 6 made of leather and reduce wrinkling and looseness thereof.

(5) In the seat according to the embodiment, the polygonal space part 10 has a hexagonal shape as shown in FIG. 3. According to this configuration, even when the base fabric 7 is pulled in any one of three directions, i.e., the direction D1 in which the first threads 8 run, the direction D2 in which the second threads 9 run, and a direction intersecting each of the first threads 8 and the second threads 9, a portion of one of or both the first threads 8 and the second threads 9 running in the zigzag manner to define the hexagonal space parts 10 is stretched and another portion of the other of or both the first threads 8 and the second threads 9 is favorably contracted. This attains reliable reduction in the wrinkling and looseness while maintaining the flexibility of the cover 6 made of leather to which the base fabric 7 is adhered.

Here, with reference to the graph shown in FIG. 7, deformation characteristics of the hexagonal space part 10 in the embodiment will be discussed in comparison with deformation characteristics of a space part having a different shape. FIG. 7 is the graph showing a relation between a tensile rate RS and a compression rate RP in horizontal pulling of polygonal space parts (e.g., in the direction D1 shown in FIG. 1). In the graph, line I is directed to lateral square space parts (i.e., each having a square shape with four side sections in an up-down direction and a left-right direction) serving as Comparative Example, line II is directed to oblique square space parts (i.e., each having a square shape with vertices in the up-down direction and the left-right direction) falling within the present invention, and line III is directed to regular hexagonal space parts 10 in the embodiment. Here, the tensile rate RS indicates an increase proportion of the length of each space part in the tensile direction of the base fabric 7, and the compression rate RP indicates a decrease proportion of the length of the space part in the direction perpendicularly intersecting the tensile direction of the base fabric 7.

It is seen from the graph shown in FIG. 7 that an increase in the tensile rate RS is small concerning line I representing the deformation characteristics in horizontal pulling of the lateral square space parts. Besides, the compression rate RP is maintained at zero regardless of the increase in the tensile rate RS. By contrast, concerning each of line II representing the deformation characteristics of the oblique square space parts falling within the present invention and line III representing the deformation characteristics of the regular hexagonal space parts 10 in the embodiment, an increase in the tensile rate RS is as four to five times large as that of the line I. Moreover, the compression rate RP increases in accordance with the increase in the tensile rate RS. Referring to FIG. 7, a sufficient compressive force occurs in an application of a tensile force to the base fabric 7 in each case of the oblique square space parts (line II) falling within the present invention and the regular hexagonal space parts 10 (line III) in the embodiment. Therefore, the cover 6 to which the base fabric 7 is adhered avoids too excessive tension and looseness. This results in attaining reduction in the wrinkling and looseness of the cover 6 while maintaining the flexibility of the cover 6, in particular, the flexibility in the out-of-plane direction.

Furthermore, the base fabric 7 adhered to the cover 6 made of leather has the tensile rate RS of 10% or lower (to fall within a region B in FIG. 7). Hence, even the regular hexagonal space parts 10 (line III) have no significant difference from the oblique square space parts (line II) in practical deformation characteristics.

(6) The seat 1 according to the embodiment may include the base fabric 7 where one first thread 8 twistedly joins another first thread 8 or one second thread 9 twistedly joins another second thread 9 as shown in FIG. 4B. In this case, the first threads 8 can tightly join each other, or the second threads 9 can tightly join each other. In addition, an increase in the number of components is suppressible.

(7) In the seat 1 according to the embodiment, the base fabric 7 may further include, as shown in FIG. 4C, the connecting member 13 that connects the first threads 8 to each other at a distance therebetween or connects the second threads 9 to each other at a distance therebetween. In this configuration, two adjacent first threads 8 are connected to each other at a distance therebetween or two adjacent second threads 9 are connected to each other at a distance therebetween via the connecting member 13. This configuration thus allows the first threads 8 to be connected to each other at a specific distance therebetween or allows the second threads 9 to be connected to each other at a specific distance therebetween. As a result, the shape and arrangement of the polygonal space parts 10 in the base fabric 7 are favorably changeable, and thus designability of the base fabric 7 is increased.

(8) In the seat 1 according to the embodiment, a general direction D1 in which the first threads 8 run and a general direction D2 in which the second threads 9 run perpendicularly intersect each other as shown in FIG. 3. In this configuration, even when the base fabric 7 is pulled in either of the direction D1 and the direction D2, the first threads 8 and the second threads 9 running in the zigzag manner to define the polygonal (hexagonal) space parts 10 perpendicularly intersect each other. Therefore, when a portion of one of or both the first threads 8 and the second threads 9 is stretched, another portion of the other of or both the first threads 8 and the second threads 9 is ensured to be contracted in response thereto. This attains reliable reduction in the wrinkling and looseness while maintaining the flexibility of the cover 6 made of leather to which the base fabric 7 is adhered.

(9) In the seat 1 according to the embodiment, the first threads 8 serving as the first linear members and the second threads 9 serving as the second linear members are made of thread as shown in FIGS. 2 to 3. The base fabric 7 is a woven fabric including the first threads 8 and the second threads 9. The first threads 8 and the second threads 9 are woven with one another in the zigzag manner to planarly fill the surface of the base fabric 7 with the polygonal (hexagonal, in the embodiment) space parts 10 defined by the first threads 8 and the second threads 9.

In this configuration, the base fabric 7 adhered to the cover 6 made of leather is a woven fabric including the polygonal space parts 10 defined by the first linear members and the second linear members, i.e., the first threads 8 and the second threads 9, made of thread and woven with one another in the zigzag manner. Therefore, even when the base fabric 7 is pulled in any direction (e.g., in the direction D1 as shown in FIG. 5A or in the direction D2 as shown in FIG. 5B), one of the first threads 8 and the second threads 9 made of thread and running in the zigzag manner to define the polygonal space parts 10 is stretched and the other of the first threads 8 and the second threads 9 is contracted. Alternatively, a portion of both the first threads 8 and the second threads 9 running in the zigzag manner to define the polygonal space parts 10 is stretched, and another portion of both the first threads 8 and the second threads 9 is contracted. This attains reliable reduction in the wrinkling and looseness of the cover 6 while maintaining the flexibility of the cover 6 (in particular, the flexibility of the cover 6 in the out-of-plane direction) made of leather to which the base fabric 7 is adhered.

Modifications (A) Although the base fabric 7 planarly filled with the hexagonal space parts 10 is described as an example of the base fabric 7 planarly filled with the polygonal space parts 10 in the embodiment, the present invention is not limited thereto.

Figure 8A:
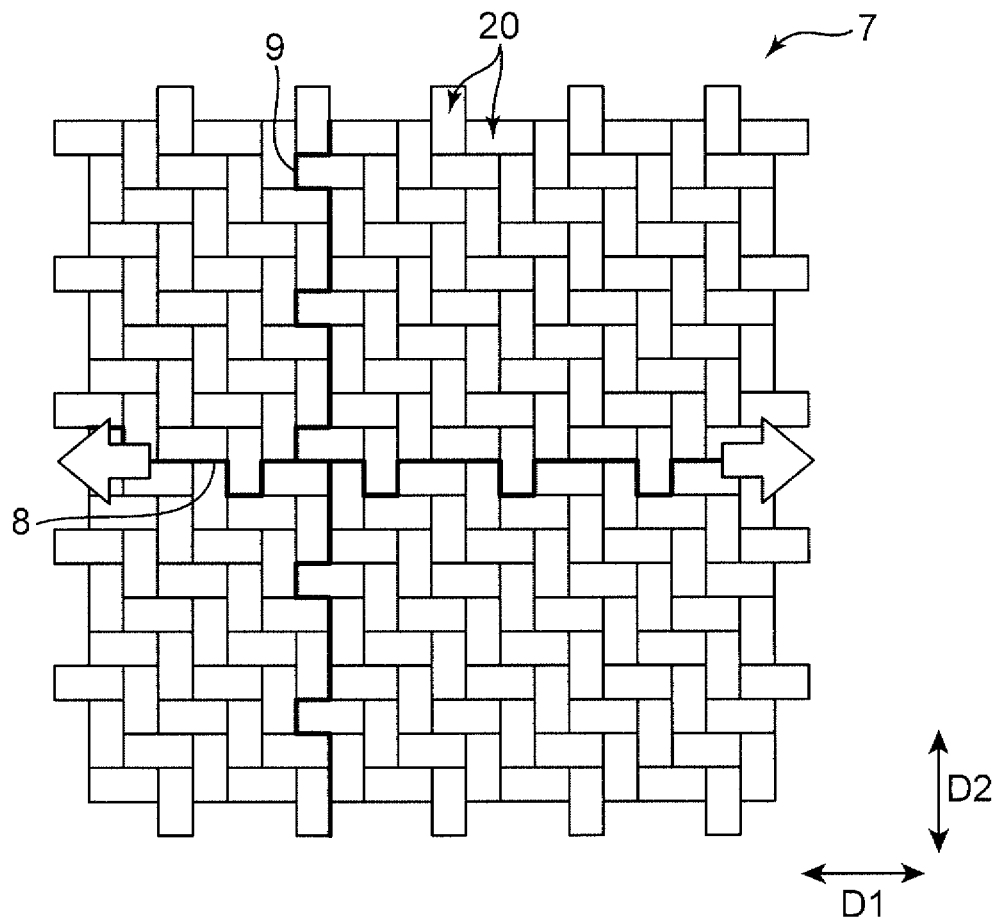
FIG. 8A is an explanatory plan view showing a structure of a base fabric, in a modification of the present invention, planarly filled with rectangular space parts defined by first threads and second threads running in a zigzag manner to be oriented in different directions from each other.
Figure 8B:
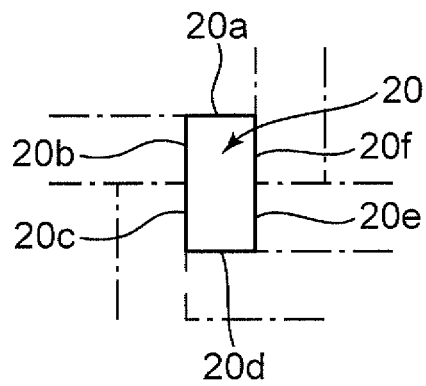
FIG. 8B is an enlarged view of the rectangular space part in FIG. 8A having six side sections.
Figure 8C:
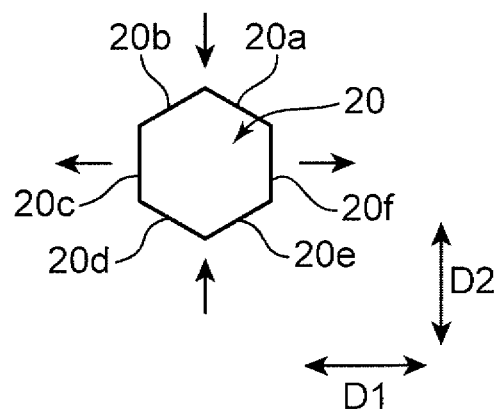
FIG. 8C is an explanatory view showing deformation of the rectangular space part into a hexagonal shape as a result of pulling of the base fabric in a direction D1.

FIG. 8A to 8C show a modification of the seat according to the present invention including polygonal space parts 20 each having six side sections 20a to 20f and being deformable into a hexagonal shape as shown in FIG. 8C when a base fabric 7 is pulled in either a direction D1 or a direction D2.

Specifically, the base fabric 7 shown in FIG. 8A includes the rectangular space parts 20 oriented in different directions. More specifically, first threads 8 and second threads 9 run in a zigzag manner to define the rectangular space parts 20 oriented in the different directions so that a surface of the base fabric 7 is planarly filled with the rectangular space parts 20 oriented in the different directions.

As shown in FIG. 8B, each of the rectangular space parts 20 has the six side sections 20a to 20f. Hence, as shown in FIG. 8C, when the base fabric 7 is pulled, for example, in the direction D1, a tensile force in the direction D1 and a compressive force in a direction D2 perpendicularly intersecting the direction D1 are applied onto each rectangular space part 20. Consequently, the six side sections 20a to 20f shift to allow the rectangular space part 20 to deform into a hexagonal shape.

Accordingly, in the modification shown in FIG. 8A to 8C, even when the base fabric 7 is pulled in any one of three directions, i.e., the direction in which the first threads 8 run, the direction in which the second threads 9 run, and a direction intersecting each of the first threads 8 and the second threads 9, a portion of one of or both the first threads 8 and the second threads 9 running in the zigzag manner is stretched and another portion of the other of or both the first threads 8 and the second threads 9 is favorably contracted while allowing each space part 20 having the side sections 20a to 20f to deform into a hexagonal shape. This attains reliable reduction in the wrinkling and looseness while maintaining the flexibility of the cover 6 made of leather to which the base fabric 7 is adhered.

Figure 9:
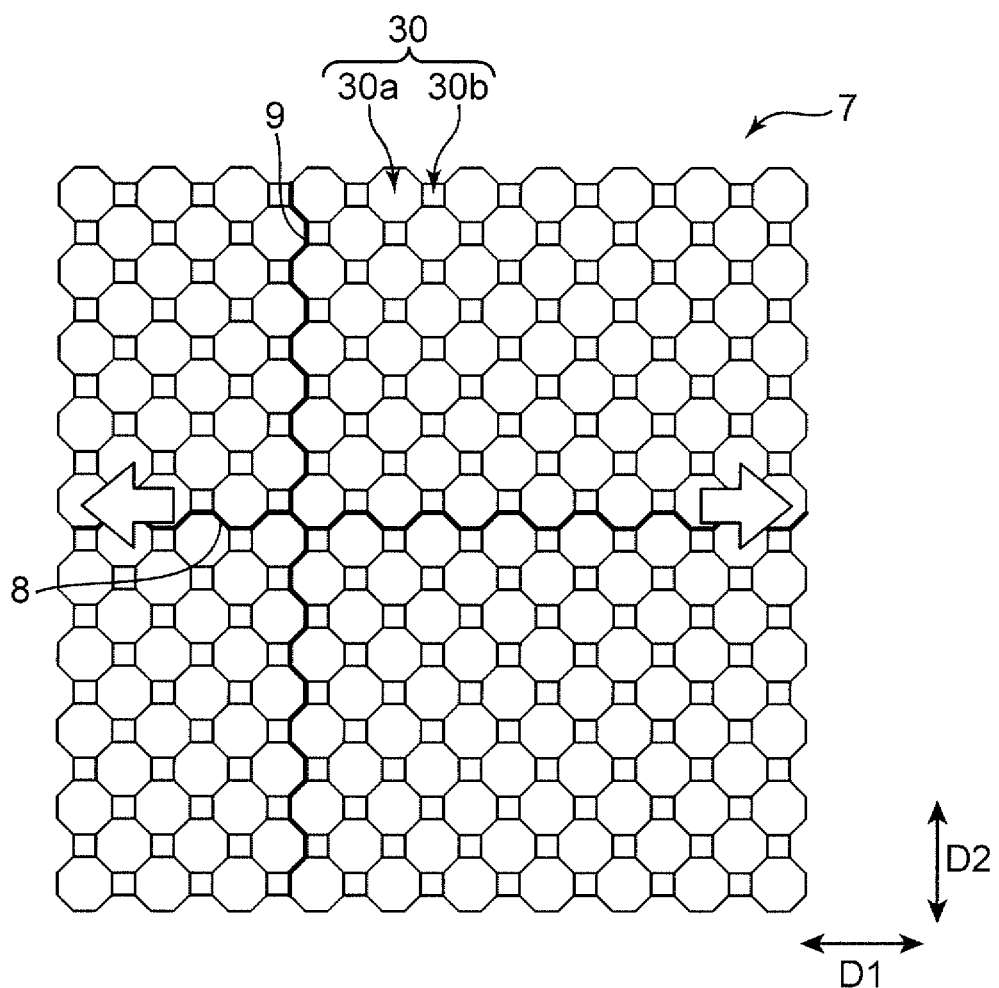
FIG. 9 is an explanatory plan view showing a structure of a base fabric, in another modification of the present invention, planarly filled with polygonal space parts defined by first threads and second threads running in a zigzag manner, each of the polygonal space parts having an octagonal space and a quadrangular space in connection.

(B) Another modification of the base fabric 7 planarly filled with the polygonal space parts includes polygonal space parts 30, as shown in FIG. 9, each having an octagonal space 30a and a quadrangular space 30b in connection.

Specifically, a base fabric 7 in the modification of the present invention as shown in FIG. 9 is planarly filled with the polygonal space parts 30 defined by first threads 8 and second threads 9 running in the zigzag manner to each have the octagonal space 30a and the quadrangular space 30b in connection.

According to the modification shown in FIG. 9, even when the base fabric 7 is pulled in any one of three directions, i.e., a direction D1 in which the first threads 8 run, a direction D2 in which the second threads 9 run, and a direction intersecting each of the first threads 8 and the second threads 9, a portion of one of or both the first threads 8 and the second threads 9 running in the zigzag manner to define the space parts 30 each having the octagonal space 30a and the quadrangular space 30b in connection is stretched and another portion of the other of or both the first threads 8 and the second threads 9 is favorably contracted. This attains reliable reduction in the wrinkling and looseness while maintaining the flexibility of the cover 6 made of leather to which the base fabric 7 is adhered.

Figure 10:
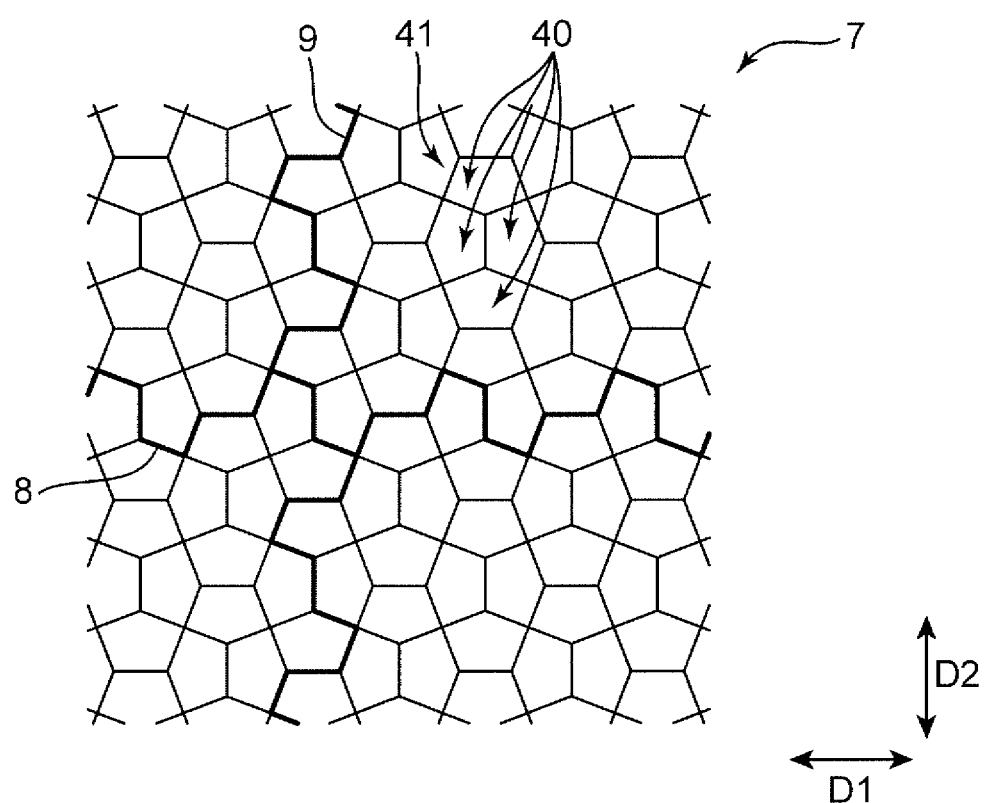
FIG. 10 is an explanatory plan view showing a structure of a base fabric, in still another modification of the present invention, planarly filled with hexagonal collection space parts each formed by a combination of four pentagonal space parts defined by first threads and second threads in a zigzag manner.

(C) As still another modification of the base fabric 7 planarly filled with the polygonal space parts, a base fabric 7 as shown in FIG. 10 may be planarly filled with hexagonal collection space parts 41 formed by a combination of four pentagonal space parts 40 defined by first threads 8 and second threads 9 running in a zigzag manner. According to this configuration, even when the base fabric 7 is pulled in any one of three directions, i.e., a direction D1 in which the first threads 8 run, a direction D2 in which the second threads 9 run, and a direction intersecting each of the first threads 8 and the second threads 9, a portion of one of or both the first threads 8 and the second threads 9 defining the pentagonal space parts 40 and the hexagonal collection space parts 41 each having the pentagonal space parts is stretched and another portion of the other of or both the first threads 8 and the second threads 9 is favorably contracted. This attains reliable reduction in the wrinkling and looseness while maintaining the flexibility of the cover 6 made of leather to which the base fabric 7 is adhered.

Figure 11:
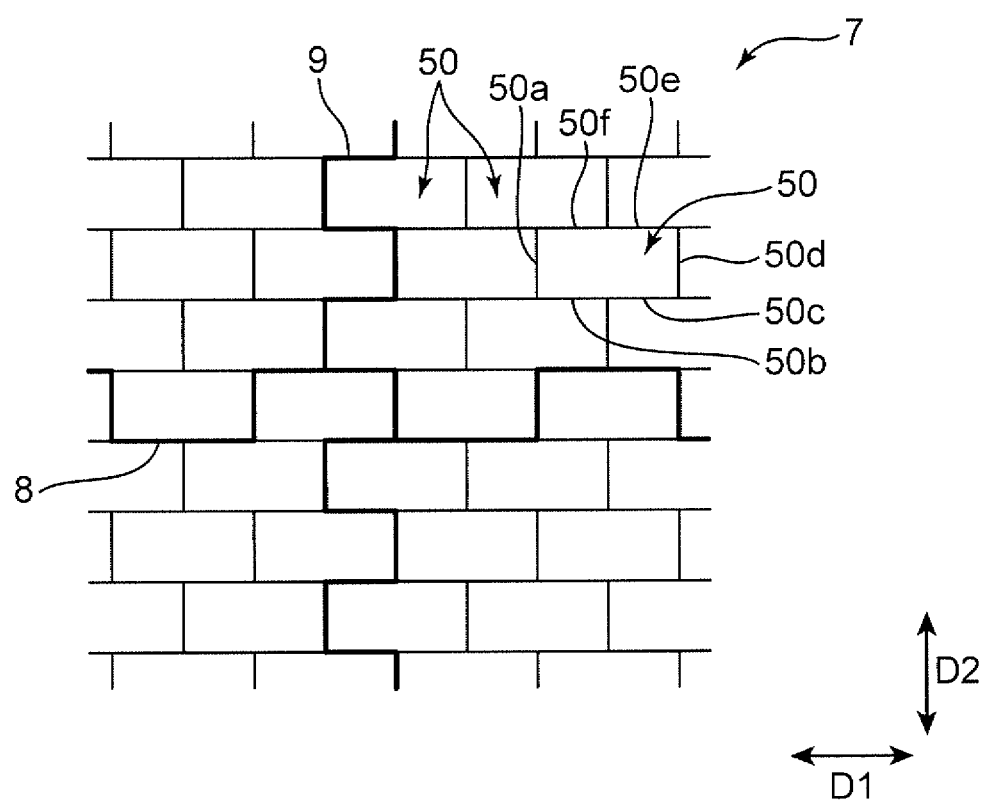
FIG. 11 is an explanatory plan view showing a structure of a base fabric, in further another modification of the present invention, planarly filled with a plurality of rectangular space parts defined by first threads and second threads running in a zigzag manner to deviate from each other in the direction D1 and the direction D2.

(D) As further another modification of the base fabric 7 planarly filled with the polygonal space parts, a base fabric 7 as shown in FIG. 11 may be planarly filled with a plurality of rectangular space parts 50 defined by first threads 8 and second threads 9 running in a zigzag manner to deviate from each other in a direction D1 and a direction D2.

Each of the rectangular space parts 50 shown in FIG. 11 also has six side sections 50a to 50f in the same manner as the rectangular space part 20 shown in FIGS. 8A to 8C. Hence, when the base fabric 7 is pulled, for example, in the direction D1, a tensile force in the direction D1 and a compressive force in the direction D2 perpendicularly intersecting the direction D1 are applied onto each rectangular space part 50. Consequently, the six side sections 50a shift to allow the rectangular space part 50 to deform into a hexagonal shape.

Accordingly, in the modification shown in FIG. 11, even when the base fabric 7 is pulled in any one of three directions, i.e., a direction in which the first threads 8 run, a direction in which the second threads 9 run, and a direction intersecting each of the first threads 8 and the second threads 9, a portion of one of or both the first threads 8 and the second threads 9 running in the zigzag manner is stretched and another portion of the other of or both the first threads 8 and the second threads 9 is favorably contracted while allowing each space part 50 having the side sections 50a to 50f to deform into a hexagonal shape. This attains reliable reduction in the wrinkling and looseness while maintaining the flexibility of the cover 6 made of leather to which the base fabric 7 is adhered.

(E) Although the base fabric is described as a woven fabric including the first threads and second threads intersecting each other, i.e., the first threads and the second threads woven with one another, in the embodiment and modifications (A) to (D), a third thread or yarn running in a zigzag manner in a direction intersecting each of a first thread and a second thread may be added. Even in this case, the first threads, the second threads, and the third threads or yarns run in a zigzag manner to define polygonal space parts in the base fabric so that a surface of the base fabric is planarly filled with the polygonal space parts. In this way, the polygonal space parts may be woven in the base fabric.

Figure 12:
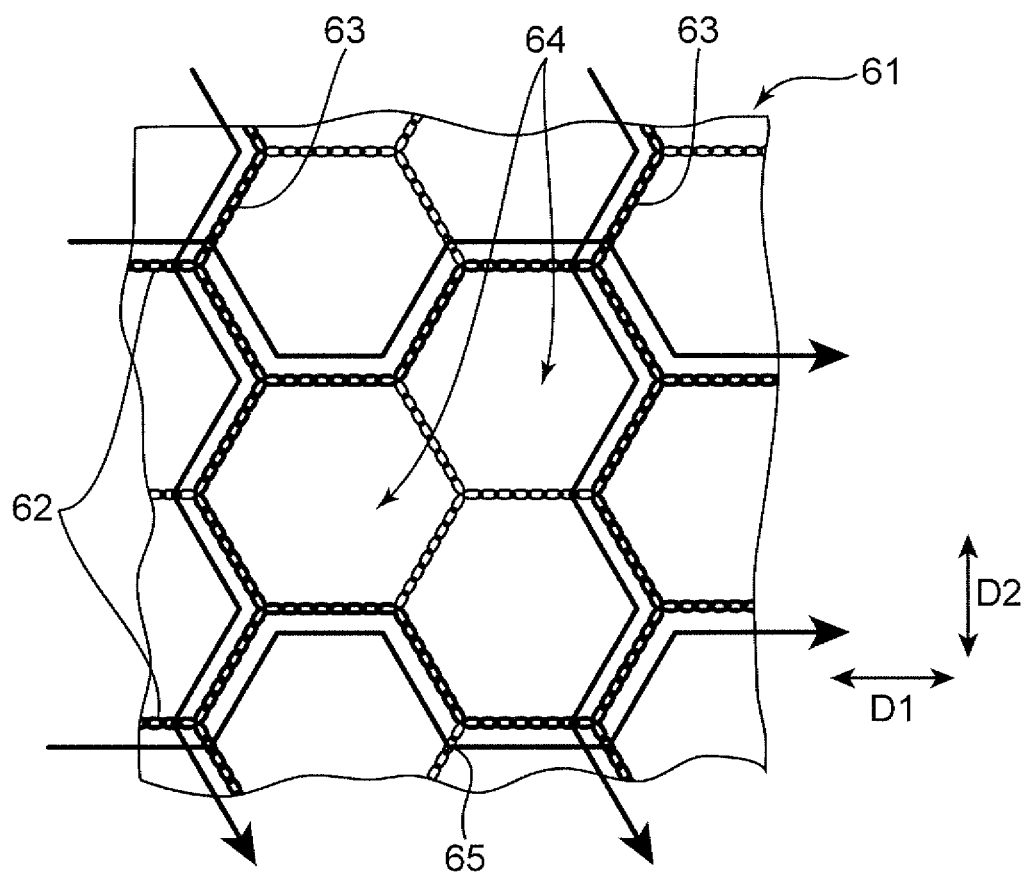
FIG. 12 is an explanatory plan view showing a structure of a base fabric, in still further another modification of the present invention, which is a knitted fabric including first linear members and second linear members running in a zigzag manner.

Specifically in the modification shown in FIG. 12, a base fabric 61 is a knitted fabric. More specifically, the base fabric 61 is a knitted fabric knitted with at least one yarn 65 so as to combine a plurality of first linear members 62 and a plurality of second linear members 63, and the first linear members 62 and the second linear members 63 are connected to each other in a zigzag manner to planarly fill a surface of the base fabric 61 with polygonal space parts 64 defined by the first linear members 62 and the second linear members 63. Here, the knitted fabric including the first linear members 62 and the second linear members 63 is obtainable by various kinds of conventionally known ways like crocheting.

In this configuration, the base fabric 61 adhered to a cover 6 (see FIG. 2) made of leather is a knitted fabric in which the polygonal space parts 64 are incorporated. The polygonal space parts 64 are defined by the first linear members 62 and the second linear member connected to each other in the zigzag manner. Therefore, even when the base fabric 61 is pulled in either of the direction D1 and the direction D2, one of the first linear members 62 and the second linear members 63 running in the zigzag manner to define the polygonal space parts 64 is stretched and the other of the first linear members 62 and second linear members 63 is contracted. Alternatively, a portion of both the first linear members 62 and the second linear members 63 running in the zigzag manner to define the polygonal space parts 64 is stretched, and another portion of both the first linear members 62 and the second linear members 63 is contracted. This attains reliable reduction in the wrinkling and looseness of the cover 6 while maintaining the flexibility of the cover 6 (in particular, the flexibility of the cover 6 in an out-of-plane direction) made of leather to which the base fabric 61 is adhered.

Summary of Embodiment

The embodiment is summarized in the following manner.

A seat according to the embodiment includes: a pad; a cover made of leather and covering a surface of the pad; and a base fabric adhered to a surface of the cover that faces the pad. The base fabric includes a plurality of first linear members running in a predetermined direction and a plurality of second linear members running in a direction intersecting the predetermined direction. The first linear members and the second linear members are connected to each other in a zigzag manner to planarly fill a surface of the base fabric with polygonal space parts defined by the first linear members and the second linear members.

In this configuration, the base fabric adhered to the cover made of leather includes the polygonal space parts. Therefore, even when the base fabric is pulled in any direction, one of the first linear members and the second linear members running in the zigzag manner to define the polygonal space parts is stretched and the other of the first linear members and the second linear members is contracted. Alternatively, a portion of both the first linear members and the second linear members running in the zigzag manner to define the polygonal space parts is stretched, and another portion of both the first linear members and the second linear members is contracted. This attains reliable reduction in the wrinkling and looseness of the cover while maintaining the flexibility of the cover (in particular, the flexibility of the cover in the out-of-plane direction) made of leather to which the base fabric is adhered.

In the seat, each of the polygonal space parts is preferably defined by a portion of the first linear member having two or more corners and a portion of the second linear member having two or more corners.

According to this configuration, the polygonal space part can have various shapes, such as a hexagonal shape and an octagonal shape, by a combination of a portion of the first linear member running in the zigzag manner and having two or more corners and a portion of the second linear member running in the zigzag manner and having two or more corners. Therefore, it is possible to produce a base fabric which is more effective to maintain the flexibility of the cover made of leather and reduce the wrinkling and looseness thereof.

In the seat, the polygonal space part preferably has a hexagonal shape.

According to this configuration, even when the base fabric is pulled in any one of three directions, i.e., the direction in which the first linear members run, the direction in which the second linear members run, and a direction intersecting each of the first linear members and the second linear members, a portion of one of or both the first linear members and the second linear members running in the zigzag manner to define the hexagonal space parts is stretched and another portion of the other of or both the first linear members and the second linear members is favorably contracted. This attains reliable reduction in the wrinkling and looseness while maintaining the flexibility of the cover made of leather to which the base fabric is adhered.

In the seat, preferably, the polygonal space part has six side sections and is deformable into a hexagonal shape when the base fabric is pulled.

According to this configuration, even when the base fabric is pulled in any one of three directions, i.e., the direction in which the first linear members run, the direction in which the second linear members run, and a direction intersecting each of the first linear members and the second linear members, a portion of one of or both the first linear members and the second linear members running in the zigzag manner is stretched and another portion of the other of or both the first linear members and the second linear members is favorably contracted while allowing each space part having the six side sections to deform into a hexagonal shape. This attains reliable reduction in the wrinkling and looseness while maintaining the flexibility of the cover made of leather to which the base fabric is adhered.

In the seat, each of the polygonal space parts preferably has an octagonal space and a quadrangular space in connection.

According to this configuration, even when the base fabric is pulled in any one of three directions, i.e., the direction in which the first linear members run, the direction in which the second linear members run, and a direction intersecting each of the first linear members and the second linear members, a portion of one of or both the first linear members and the second linear members running in the zigzag manner to define the space parts each having the octagonal space and the quadrangular space in connection is stretched and another portion of the other of or both the first linear members and the second linear members is favorably contracted. This attains reliable reduction in the wrinkling and looseness while maintaining the flexibility of the cover made of leather to which the base fabric is adhered.

In the seat, preferably, one first linear member twistedly joins another first linear member or one second linear member twistedly joins another second linear member.

According to this configuration, the first linear members can tightly join each other, or the second linear members can tightly join each other. In addition, an increase in the number of components is suppressible.

In the seat, the base fabric preferably further includes a connecting member that connects the first linear members to each other at a distance therebetween or connects the second linear members to each other at a distance therebetween.

According to the configuration, concerning the first linear members and the second linear member, two adjacent first linear members are connected to each other at a distance therebetween or two adjacent second linear members are connected to each other at a distance therebetween via the connecting member. This configuration thus allows the first linear members to be connected to each other at a specific distance therebetween or allows the second linear members to be connected to each other at a specific distance therebetween. As a result, the shape and arrangement of the polygonal space parts in the base fabric are favorably changeable, and thus designability of the base fabric is increased.

In the seat, preferably, a direction in which the first linear members run and a direction in which the second linear members run perpendicularly intersect each other.

In this configuration, even when the base fabric is pulled in any direction, the first linear members and the second linear members running in the zigzag manner to define the polygonal space parts perpendicularly intersect each other. Therefore, when a portion of one of or both the first linear members and the second linear members is stretched, another portion of the other of or both the first linear members and the second linear members is ensured to be contracted in response thereto. This attains reliable reduction in the wrinkling and looseness while maintaining the flexibility of the cover made of leather to which the base fabric is adhered.

In the seat, preferably, the first linear members and the second linear members are made of thread, and the base fabric is a woven fabric including the first linear members and the second linear members, the first linear members and the second linear members being woven with one another in a zigzag manner to planarly fill the surface of the base fabric with the polygonal space parts defined by the first linear members and the second linear members.

In this configuration, the base fabric adhered to the cover made of leather is a woven fabric including the polygonal space parts defined by the first linear members and the second linear members made of thread and woven with one another in the zigzag manner. Therefore, even when the base fabric is pulled in any direction, one of the first linear members and the second linear members made of thread and running in the zigzag manner to define the polygonal space parts is stretched and the other of the first linear members and the second linear members is contracted. Alternatively, a portion of both the first linear members and the second linear members running in the zigzag manner to define the polygonal space parts is stretched, and another portion of both the first linear members and the second linear members is contracted. This attains reliable reduction in the wrinkling and looseness of the cover while maintaining the flexibility of the cover (in particular, the flexibility of the cover in the out-of-plane direction) made of leather to which the base fabric is adhered.

In the seat, preferably, the base fabric is a knitted fabric knitted with at least one yarn so as to combine the first linear members and the second linear members, the first linear members and the second linear members being connected to each other in a zigzag manner to planarly fill the surface of the base fabric with polygonal space parts defined by the first linear members and the second linear members to form the knitted fabric.

In this configuration, the base fabric adhered to the cover made of leather is a knitted fabric in which the polygonal space parts are incorporated. The polygonal space parts are defined by the first linear members and the second linear members connected to each other in the zigzag manner. Therefore, even when the base fabric is pulled in any direction, one of the first linear members and the second linear members running in the zigzag manner to define the polygonal space parts and form the knitted fabric is stretched and the other of the first linear members and the second linear members is contracted. Alternatively, a portion of both the first linear members and the second linear members running in the zigzag manner to define the polygonal space parts is stretched, and another portion of both the first linear members and the second linear members is contracted. This attains reliable reduction in the wrinkling and looseness of the cover while maintaining the flexibility of the cover (in particular, the flexibility of the cover in the out-of-plane direction) made of leather to which the base fabric is adhered.

INDUSTRIAL APPLICABILITY

A seat of the present invention is widely applicable to any seat in addition to a seat for an automobile as long as the seat has a structure including a cover made of leather and covering a surface of a pad. For instance, the seat of the present invention is applicable to a seat to be installed in a vehicle, such as an airplane and a train, or to a leather sofa or a leather chair to be arranged in a building or a house.

EXPLANATION OF REFERENCE NUMERALS 1 seat
5 pad
6 cover made of leather
7, 61 base fabric
8 first thread (first linear member)
9 second thread (second linear member)
10, 20, 30, 40, 50, 64 space part
11 twisted part
13 connecting member
20a to 20c, 50a to 50c side section
30a octagonal space
30b quadrangular space
41 collection space part
62 first linear member
63 second linear member

The invention claimed is:

1. A seat comprising:
a pad;
a cover made of leather and covering a surface of the pad; and
a base fabric adhered to a surface of the cover that faces the pad, wherein
the base fabric includes a plurality of first linear members running in a predetermined direction and a plurality of second linear members running in a direction intersecting the predetermined direction,
the first linear members and the second linear members being connected to each other in a zigzag manner to planarly fill a surface of the base fabric with polygonal space parts defined by the first linear members and the second linear members, and
each of the polygonal space parts is defined by a portion of the first linear member having two or more corners and a portion of the second linear member having two or more corners.

2. The seat according to claim 1, wherein
the polygonal space part has a hexagonal shape.

3. The seat according to claim 1, wherein
the polygonal space part has six side sections and is deformable into a hexagonal shape when the base fabric is pulled.

4. The seat according to claim 1, wherein
each of the polygonal space parts has an octagonal space and a quadrangular space in connection.

5. The seat according to claim 1, wherein
one first linear member twistedly joins another first linear member or one second linear member twistedly joins another second linear member.

6. The seat according to claim 1, wherein
the base fabric further includes a connecting member that connects the first linear members to each other at a distance therebetween or connects the second linear members to each other at a distance therebetween.

7. The seat according to claim 1, wherein
a direction in which the first linear members run and a direction in which the second linear members run perpendicularly intersect each other.

8. The seat according to claim 1, wherein
the first linear members and the second linear members are made of thread, and
the base fabric is a woven fabric including the first linear members and the second linear members,
the first linear members and the second linear members being woven with one another in a zigzag manner to planarly fill the surface of the base fabric with the polygonal space parts defined by the first linear members and the second linear members.

9. The seat according to claim 1, wherein
the base fabric is a knitted fabric knitted with at least one yarn so as to combine the first linear members and the second linear members,
the first linear members and the second linear members being connected to each other in a zigzag manner to planarly fill the surface of the base fabric with the polygonal space parts defined by the first linear members and the second linear members to form the knitted fabric.

* * * * *